United States Patent
Roozemond et al.

(10) Patent No.: US 12,404,402 B2
(45) Date of Patent: Sep. 2, 2025

(54) FOAMED COMPOSITION

(71) Applicant: DSM IP Assets B.V., Heerlen (NL)

(72) Inventors: Peter Roozemond, Echt (NL); Nancy Eisenmenger, Echt (NL); Tom Antonius Philomena Engels, Echt (NL)

(73) Assignee: ENVALIOR B.V., Geleen (NL)

( * ) Notice: Subject to any disclaimer, the term of this patent is extended or adjusted under 35 U.S.C. 154(b) by 986 days.

(21) Appl. No.: 17/417,020

(22) PCT Filed: Dec. 19, 2019

(86) PCT No.: PCT/EP2019/086333
§ 371 (c)(1),
(2) Date: Jun. 21, 2021

(87) PCT Pub. No.: WO2020/127753
PCT Pub. Date: Jun. 25, 2020

(65) Prior Publication Data
US 2022/0073730 A1    Mar. 10, 2022

(30) Foreign Application Priority Data

Dec. 22, 2018 (EP) .................................... 18215814
Mar. 18, 2019 (EP) .................................... 19163567

(51) Int. Cl.
| | | |
|---|---|---|
| A43B 13/04 | (2006.01) |
| A43B 13/18 | (2006.01) |
| A43B 17/14 | (2006.01) |
| C08G 63/672 | (2006.01) |
| C08J 9/00 | (2006.01) |
| C08J 9/12 | (2006.01) |
| C08J 9/18 | (2006.01) |
| C08J 9/232 | (2006.01) |
| C08L 67/02 | (2006.01) |

(52) U.S. Cl.
CPC ............ *C08L 67/025* (2013.01); *A43B 13/04* (2013.01); *A43B 13/187* (2013.01); *C08J 9/122* (2013.01); *C08J 9/18* (2013.01); *C08J 2203/06* (2013.01); *C08J 2207/00* (2013.01); *C08J 2367/02* (2013.01); *C08J 2371/02* (2013.01)

(58) Field of Classification Search
None
See application file for complete search history.

(56) References Cited

U.S. PATENT DOCUMENTS

| | | | |
|---|---|---|---|
| 2011/0301283 A1* | 12/2011 | Schellekens | C08K 7/14 524/604 |
| 2016/0297943 A1 | 10/2016 | Däschlein et al. | |
| 2019/0300670 A1* | 10/2019 | Kondo | C08J 9/18 |
| 2019/0375889 A1* | 12/2019 | Roozemond | C08J 9/0038 |
| 2022/0073728 A1* | 3/2022 | Roozemond | C08J 9/122 |

FOREIGN PATENT DOCUMENTS

| | | | |
|---|---|---|---|
| WO | WO-2018012089 A1 * | 1/2018 | A43B 13/04 |
| WO | 2018/134166 | 7/2018 | |

OTHER PUBLICATIONS

International Search Report for PCT/EP2019/086333 mailed Jan. 29, 2020, 3 pages.
Written Opinion of the ISA for PCT/EP2019/086333 mailed Jan. 29, 2020, 3 pages.

* cited by examiner

*Primary Examiner* — Melissa A Rioja
(74) *Attorney, Agent, or Firm* — Nixon & Vanderhye, P.C.

(57) ABSTRACT

The invention relates to a foamed composition comprising a thermoplastic copolyester elastomer, wherein the foamed composition has a relative solution viscosity of at least 4.1 as measured according to ISO 1628-5:2015 and wherein the thermoplastic copolyester elastomer comprises hard segments built up from polyester repeating units derived from at least one aliphatic diol and at least one aromatic dicarboxylic acid or an ester thereof and soft segments being polytetramethylene oxide. The invention also relates to a process for preparing the foamed composition.

10 Claims, 1 Drawing Sheet

FOAMED COMPOSITION

This application is the U.S. national phase of International Application No. PCT/EP2019/086333 filed Dec. 19, 2019 which designated the U.S. and claims priority to EP Patent Application No. 18215814.7 filed Dec. 22, 2018 and EP Patent Application No. 19163567.1 filed Mar. 18, 2019, the entire contents of each of which are hereby incorporated by reference.

This invention relates to a foamed composition, an article comprising the foamed composition, as well as a process for preparing the foamed composition.

Foamed compositions are known and are for example described in WO2018134166. A disadvantage of these foams is that they contain plasticizer, which may leach out. US2016/0297943 also describes foams, however, these densities are rather high.

It is thus an object of the present invention to provide a foamed composition which exhibits low densities, while a needing a lesser amount of plasticizer, or even not needing plasticizer at all. This object is achieved by a foamed composition comprising a thermoplastic copolyester elastomer, wherein the foamed composition has a relative solution viscosity of at least 4.1 as measured according to ISO 1628-5:2015 and wherein the thermoplastic copolyester elastomer comprises hard segments built up from polyester repeating units derived from at least one aliphatic diol and at least one aromatic dicarboxylic acid or an ester thereof and soft segments being polytetramethylene oxide.

Surprisingly, the inventors have found that when the foamed composition comprises a thermoplastic copolyester elastomer and wherein the foamed composition has a relative solution viscosity (RSV) of at least 4.1 as measured according ISO 1628-5:2015, low densities can be obtained, while the amount of cracks is kept low, or may even be absent. Without wishing to be bound by theory the inventors believe that cracks are formed by overstretching of cell walls, causing rupture and cascading failure of cells leading to formation of a big bubble. After foaming, a bubble is usually visible, which disappears over time, and leaving a so-called crack. Such an interior crack can also form in roughly spherical or elliptical pellets and after foaming it results in a hollow interior void which is apparent when the foamed bead is cross-sectioned. Cracks may exist only in the interior of the sample and/or they can extend all the way to the surface of the part. Cracks are unattractive and are to be avoided.

Figure 1:
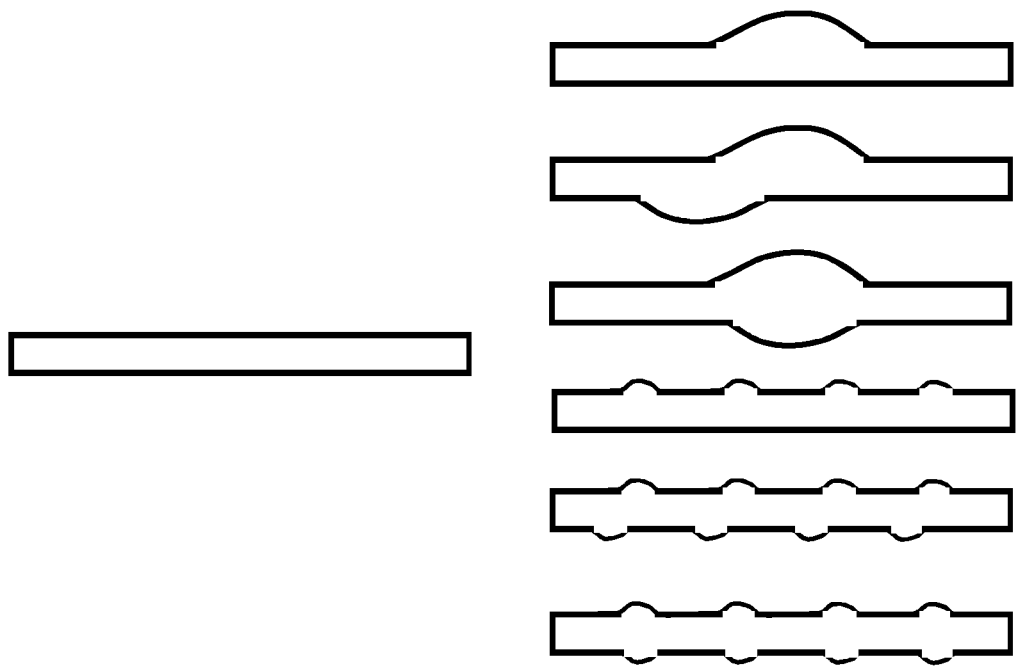

FIG. 1 provides a representation of crack formation. Left column is a sample without cracks and on the right column samples are depicted with indication of cracks.

Figure 2:

FIG. 2 provide a representation of crack formation in beads. Left is a bead without cracks and the 3 further beads all exemplify a bead with cracks.

Lower density crack-free foams are very attractive as it is an important selling argument in applications where lightweight is favorable, for example sports shoes.

A foamed composition is herein understood to be known to a person skilled in the art. Preferably a foamed composition has a density of at most 0.7 g/cm$^3$.

The foamed composition has an RSV of at least 4.1 as measured according to ISO 1628-5:2015, preferably at least 4.2, more preferably at least 4.3 and even more preferred at least 4.5, and most preferred at least 5.0. The RSV is a property of the foamed composition and can for example be influenced by the molecular weight of the thermoplastic copolyester elastomer employed in the composition.

Relative solution viscosity (RSV) is measured according to ISO 1628-5:2015. The RSV is measured at a concentration of 1 gram of foamed composition in 100 gram of m-cresol at 25.00+0.05° C. The foamed composition may consist of a polymer. In general, the RSV is measured at a concentration of 1 gram of polymer in 100 gram of m-cresol at 25.00+0.05° C. Viscometer of the suspended level Ubbelohde type (e.g. DIN Ubbelohde from Schott (ref. no. 53023), capillary No IIc, capillary diameter 1.50 mm, capillary constant 0.3; (appendix 3)) is used. For high molar mass samples, it may be that the maximum efflux time of the equipment (combination of Ubbelohde type and measuring device) is exceeded. In those cases the concentration is to be reduced to e.g. 0.5 g/dl, allowing to do good measurements. For comparison reasons the obtained viscosity value is then recalculated to concentration of 1 g/dl using Huggins' equation with a Huggins' constant (kH) of 0.2616. An upper limit of the RSV is usually determined by the sensitivity of the instrument and the ability to dissolve the polymer or the foamed composition fully, which measures the RSV and may for example be at most 100.

The molecular weight and thus the RSV of a foamed composition comprising a thermoplastic copolyester elastomer can be increased by measures known to a person skilled in the art, such as for example to increase the molecular weight and thus RSV of the thermoplastic copolyester elastomer employed in foaming, for example by longer polymerization times, solid state post condensation, chain extenders.

Solid state post condensation (SSPC) is a technique known to a person skilled in the art and involves heating of a polymer to a temperature which is below the melting temperature of the polymer, preferably after a compounding step with optional other ingredients, and keeping the polymer at an elevated temperature for a particular time while removing gaseous condensation products, usually between 4 and 60 hours, preferably between 12 and 50 hours. Usually, solid state post condensation is carried out on particles of the polymer, suitably pellets, but may also be performed on molded articles as such. SSPC may be carried out by any mode and in any apparatus suitable for that purpose, for example as a batch process, or a continuous process. An example of a batch process is employing a tumble dryer. An example of a continuous process is a moving bed reactor.

With "the foamed composition having an RSV" is hereby understood the RSV of the foamed composition as such and excludes glues, resins and other materials used to for example combine foamed compositions. These other components may have a different RSV and should be removed prior to the measurement of the RSV of the foamed composition.

A thermoplastic copolyester elastomer is herein understood to be a copolymer comprising hard segments built up from polyester repeating units derived from at least one aliphatic diol and at least one aromatic dicarboxylic acid or an ester thereof, and soft segments being polytetramethylene oxide (PTMO).

The thermoplastic copolyester elastomer may contain minor amounts of comonomers, such as branching agents, chain extenders, and catalysts, which are usually employed during preparation of the thermoplastic copolyester elastomer. With minor amounts is herein understood to be at most 10 wt % with respect to the total amount of thermoplastic copolyester elastomer. An example of such comonomer is dimethyl isophthalate (DMI).

Hard segments are built up from polyester repeating units derived from at least one aliphatic diol and at least one aromatic dicarboxylic acid or an ester thereof and optionally minor amounts of other diacids and/or diols.

Aliphatic diols contain generally 2-10 C-atoms, preferably 2-6 C-atoms. Examples thereof include ethylene glycol, 1,2-propylene glycol, 1,3-propylene glycol, butylene glycol, 1,2-hexane diol, 1,6-hexamethylene diol, 1,4-butanediol, 1,4-cyclohexane diol, 1,4-cyclohexane dimethanol, and mixtures thereof. Preferably, 1,4-butanediol is used.

Suitable aromatic dicarboxylic acids include terephthalic acid, isophthalic acid, phthalic acid, 2,6-naphthalenedicarboxylic acid and 4,4'-diphenyldicarboxylic acid, and mixtures thereof. Also very suitable is a mixture of 4,4'-diphenyldicarboxylic acid and 2,6-naphthalenedicarboxylic acid or a mixture of 4,4'-diphenyldicarboxylic acid and terephthalic acid. The mixing ratio between 4,4'-diphenyldicarboxylic acid and 2,6-naphthalenedicarboxylic acid or 4,4'-diphenyldicarboxylic acid and terephthalic acid is preferably chosen between 40:60-60:40 on weight basis in order to optimize the melting temperature of the thermoplastic copolyester.

The hard segment preferably has as repeating unit chosen from the group consisting of ethylene terephthalate (PET), propylene terephthalate (PPT), butylene terephthalate (PBT), polyethylene bibenzoate, polyethelyene naphatalate, polybutylene bibenzoate, polybutylene naphalatate, polypropylene bibenzoate and polypropylene naphatalate and combinations thereof. Preferably, the hard segment is butylene terephthalate (PBT), as thermoplastic copolyester elastomers comprising hard segments of PBT exhibit favourable crystallisation behaviour and a high melting point, resulting in thermoplastic copolyester elastomer with good processing properties and excellent thermal and chemical resistance.

Plasticizers are known substances to a person skilled in the art per se, and for example lowers the hardness and/or increases the strain at break of the composition as compared to the elastomer itself. Plasticizers may be present in the composition. Preferably the amount of plasticizer is less than 30 wt % based on the total amount of the composition, preferably less than 25 wt % and even more preferred less than 20 wt % and even more preferred less than 10 wt %, and most preferred the composition does not contain plasticizers.

Plasticizers include for example phthalate esters, dibasic acid esters, mellitates and esters thereof, cyclohexanoate esters, citrate esters, phosphate esters, modified vegetable oil esters, benzonate esters, and petroleum oils, and combinations thereof.

Examples of phthalates include dioctyl phthalate, dibutyl phthalate, diethyl phthalate, butylbenzyl phthalate, di-2-ethylhexyl phthalate, diisodecyl phthalate, diundecyl phthalate, diisononyl phthalate, diethyl hexyl terephthalate (DEHT), dioctyl terephthalate, dibutyl terephathalate.

Examples of dibasic acid esters include di-2-ethylhexyl adipate (DEHA), dioctyl adipate, diisobutyl adipate, dibutyl adipate, diisodecyl adipate, dibutyl glycol adipate, di-2-ethylhexyl azelate and dioctyl sebacate.

Examples of mellitates and esters thereof include trioctyl trimellitate, trimellitic acid tri-2-ethylhexyl and pyromellitic acid octyl ester.

Examples of cyclohexanoate esters include cyclohexanedicarboxylic acid ester, 2-ethyl hexanol cyclohexanedicarboxylic acid ester.

Example of phosphate esters include Triphenyl phosphate (TPP), tert-Butylphenyl diphenyl phosphate (Mono-t-but-TPP), di-tert-butylphenyl phenyl phosphate (bis-t-but-TPP), Tris(p-tert-butylphenyl) phosphate (tri-t-but-TPP), Resorcinol bis(Diphenyl Phosphate) (RDP), dichloropropyl phosphate, Bisphenol A bis-(Diphenyl Phosphate) (BDP), tricresyl phosphate (TCP), triethyl phosphate, tributyl phosphate (TBP), tri-2-ethylhexyl phosphate, trimethyl phosphate and combinations thereof. A blend of TPP, mono-t-But-TPP, Bis-t-But-TPP, Tri-t-But-TPP is also known under the name Phosflex 71B HP and is particularly suitable, as it is easily mixed with the thermoplastic elastomer.

Examples of modified vegetable oil esters include epoxidized soybean oil (ESO), epoxidized palm oil (EPO), epoxidized linseed oil (ELO) and Argan oil.

Preferably, if plasticizers are being employed, phosphate esters and modified vegetable oil esters are being employed, as these are commonly used plasticizers and easily processable.

The invention also relates to a process for preparing a foamed composition, comprising the following steps:

a. Providing a composition comprising a thermoplastic copolyester elastomer, wherein the thermoplastic copolyester elastomer comprises hard segments built up from polyester repeating units derived from at least one aliphatic diol and at least one aromatic dicarboxylic acid or an ester thereof, and soft segments being polytetramethylene oxide and wherein the RSV of the composition is at least 4.1;

b. Bringing the composition to a foaming temperature of between (Tm−100)° C. and Tm, in which Tm is the melting temperature of the hard segment of the thermoplastic copolyester elastomer composition as measured according to ISO 11357-1:2009 DSC in the second heating curve, with a heating and cooling rate of 10° C. per min under nitrogen atmosphere;

c. Providing a physical blowing agent under pressure to the composition;

d. Releasing the pressure thereby forming the foamed composition.

The preferred embodiments of the foamed compositions as disclosed above are herewith explicitly combinable with the process as disclosed above. In step a. a composition is provided. This may be in various forms, and for example includes granules, pellets, beads, chips, plaques, pre-form, film, sheet etc. The process may further comprise additional steps after step d to further process the foamed composition, such as cutting a form out of the foamed composition, and/or combining foamed compositions into parts, such as for example by steam moulding, high frequency welding, incorporation into a matrix and other consolidation techniques.

The foamed compositions may be in the form of foamed beads, and subsequently consolidated by for example heating with steam to mould the foamed beads together into a part in for example a mold or consolidated by other techniques. A mold may be filled with foamed compositions in various forms, such as foamed beads, and subsequently steam is injected, sintering the foamed compositions together to form a part. Foamed composition in the form of beads, usually have dimensions of between 1.0 and 15.0 mm, preferably between 2.0 and 10 mm and most preferred between 3.0 and 7.0 mm.

The process is particularly suitable for a composition comprising a thermoplastic copolyester elastomer comprising hard segments chosen from PBT or PET and soft segments being PTMO and an optional plasticizer is chosen from group consisting of Triphenyl phosphate (TPP), tert-Butylphenyl diphenyl phosphate (Mono-t-but-TPP), di-tert-butylphenyl phenyl phosphate (bis-t-but-TPP), Tris(p-tert-butylphenyl) phosphate (tri-t-but-TPP), Resorcinol bis (Diphenyl Phosphate) (RDP), dichloropropyl phosphate, Bisphenol A bis-(Diphenyl Phosphate) (BDP), tricresyl phosphate (TCP), triethyl phosphate, tributyl phosphate (TBP), tri-2-ethylhexyl phosphate, trimethyl phosphate, epoxidized soybean oil (ESO), epoxidized palm oil (EPO), epoxidized linseed oil (ELO) and argan oil and combinations thereof.

With "bringing the composition to a foaming temperature" is herein understood to encompass both heating as well as cooling to come to the desired temperature.

Step b and c can be done simultaneously, or first b and then c, or first c and then b in which step b has to be performed under a pressure to prevent the composition from foaming. An example when step c. is performed before step b, is when, the physical blowing agent is added under pressure (step c) while the composition is in a molten state, after which the composition is injected in a cavity (a mold) and cooled, while kept under pressure, to the foaming temperature (step b). One of the possible advantages of such a process is faster take up of the physical blowing agent by the composition.

Before step b, the composition may be molded into a pre-form, by processes such as molding.

With physical blowing agent is herein understood to be a substance which may dissolve in the composition, without reacting or decomposing. Physical blowing agent may for example be chosen from hydrocarbons such as pentane, isopentane, cyclopentane, butane, isobutene and $CO_2$ and nitrogen as well as mixtures thereof. Typical pressures for $CO_2$ in step c are 150-200 bar.

In step b. the composition is brought to a foaming temperature of between (Tm−100)° C. and Tm, in which Tm is the melting temperature of the hard segment of the thermoplastic copolyester elastomer composition as measured according to ISO 11357-1:2009 DSC in the second heating curve, with a heating and cooling rate of 10° C. per min under nitrogen atmosphere. This may be performed by heating or cooling depending on the temperature employed before step b.

The foaming temperature in step b is preferably at most (Tm−5), more preferably at most (Tm−10), most preferred at most (Tm−15), and preferably at least (Tm−80), more preferably at least (Tm−60), most preferred at least (Tm−40), as this provides foams with lower densities.

When step b is a heating step, the heating is preferably done to a temperature of at most (Tm−5), more preferably at most (Tm−10), most preferred at most (Tm−15). The heating in step b preferably done to a temperature of at least (Tm−80), more preferably at least (Tm−60), most preferred at least (Tm−40), as this provides foams with lower densities. Heating is usually performed by an external heat source while keeping the composition in a pressure vessel.

Step b may also be a cooling step, in which the temperature is lowered to a foaming temperature of at most (Tm−5), more preferably at most (Tm−10), most preferred at most (Tm−15). The foaming temperature is preferably cooled to at least (Tm−80), more preferably at least (Tm−60), most preferred at least (Tm−40). An example of cooling may be when a composition is molded into a pre-form at a temperature above the foaming temperature.

Step d is preferably done in manner so that the pressure is released as fast as possible, preferably pressure drop of at least 100 Bar per second, more preferably at least 500 Bar per second.

The process to prepare the foamed composition as described above is generally known as a batch foaming or solid-state foaming process and is to be distinguished from extrusion foaming. In a process for extrusion foaming the composition is generally to be heated to above its melting temperature.

Surprisingly, the process resulted in foams exhibiting less cracks, which allowed for very low-density foams.

The foamed composition may optionally comprise other ingredients such as colorants, pigments, nucleating agents, flame retardants, UV-stabilizers, heat-stabilizers.

The foamed composition is very suitable for application in articles for sport goods, such as shoe soles, preferably inner shoe soles or midsoles, seating, matrasses, golf balls, as the article shows a combination of low density and a high energy return. The invention thus also relates to an article comprising the foamed composition as disclosed above.

Surprisingly the foamed composition has a density of preferably between 0.10 to 0.70 g/cm$^3$, more preferably between 0.10 to 0.50 g/cm$^3$ and even more preferred between 0.11 and 0.30 g/cm$^3$. Lower densities allow for lighter material.

EXAMPLES

Materials Used
  Elastomer A1: A copolyether-ester elastomer comprising 60 wt % polytetramethylene oxide soft segment and poly butylene terephthalate (PBT) hard segment, having a shore D hardness of 33 (ISO 868) and a melting temperature of the hard segment in the thermoplastic copolyester elastomer being 195° C. as measured with DSC according to ISO 11357-1:2009 in the second heating curve, with a heating and cooling rate of 10° C. per min, under nitrogen atmosphere and an RSV of 3.45 as measured according to ISO 1628-5:2015.
  Elastomer A2: elastomer A2 was obtained by solid state post condensing elastomer A1 in pelletized form. Solid state post condensation was performed at 180° C. for 48 hours under dry nitrogen until an RSV of 6.26 was reached.

Sample Preparation
  The compositions for foaming were obtained by employing elastomer A1 and A2. The melting temperature listed in Table 1 is the peak melting temperature of the hard segment in the thermoplastic copolyester elastomer composition during second heating cycle in a DSC at heating and cooling rates of 10° C./min under nitrogen atmosphere.
  Subsequently, plates were injection molded with lateral dimensions of 80*80 mm and different thicknesses as listed in Table 1. Rectangular samples with lateral dimensions of between 10 and 20 mm were cut out of these plates for foaming tests.

Foaming
  The sample with dimensions and thickness as listed in Table 1 was placed in a pressure vessel that was electrically heated to the foaming temperature listed in Table 1.
  Subsequently, cavity was filled with $CO_2$ at the pressure listed in Table 1 by a $CO_2$ canister connected to the pressure vessel via a booster pump
  The composition was allowed to absorb $CO_2$ for the soaking time listed in Table 1.
  The pressure vessel was opened, thus achieving a fast pressure drop resulting in the foamed composition.
  Samples were visually inspected within one minute after opening the pressure vessel for bubbles on the surface, indicating the presence of cracks in the interior of the sample. Examples of samples showing indications of cracks are depicted in FIG. 1 right column. The left column of FIG. 1 shows a sample containing no cracks.
  Volume of the sample was determined by measuring length, width, and thickness using a vernier gauge after 24 hours after foaming to allow the $CO_2$ still present in the sample to diffuse out. Mass of the sample was determined by weighing and density of the sample was determined by dividing mass by volume.

TABLE 1

| | | Tm of hard segment (° C.) | Before foaming | | | Foaming conditions | | | After foaming | | |
|---|---|---|---|---|---|---|---|---|---|---|---|
| | Material | | Length (mm) | Width (mm) | Thickness (mm) | Temperature (° C.) | Pressure (bar) | Soaking time (min) | final density (g/cc) | Cracks visible? | RSV of foamed composition |
| Comparative Experiment A | Elastomer A1 | 195 | 15.5 | 15.6 | 3.07 | 145 | 200 | 25 | 0.34 | No | 3.45 |
| Comparative Experiment B | Elastomer A1 | 195 | 15.55 | 15.52 | 3.05 | 150 | 200 | 25 | 0.27 | Yes | 3.45 |
| Ex. 1 | Elastomer A2 | 195 | 20.38 | 17.3 | 2.96 | 145 | 200 | 25 | 0.42 | No | 6.26 |
| Ex. 2 | Elastomer A2 | 195 | 20.95 | 20.17 | 2.98 | 165 | 200 | 25 | 0.28 | No | 6.26 |
| Ex. 3 | Elastomer A2 | 195 | 20.39 | 20.68 | 2.99 | 170 | 200 | 25 | 0.23 | No | 6.26 |
| Ex. 4 | Elastomer A2 | 195 | 20.00 | 20.25 | 2.98 | 175 | 200 | 25 | 0.16 | Yes | 6.26 |

The invention claimed is:

1. A foamed thermoplastic elastomer composition comprising:
   a thermoplastic copolyester elastomer which comprises hard segments comprised of polybutylene terephthalate and soft segments comprised of polytetramethylene oxide, wherein
   the foamed thermoplastic elastomer composition has a density between 0.1 to 0.7 g/cm$^3$ and a relative solution viscosity (RSV) of at least 4.1 as measured according to ISO 1628-5:2015, and wherein
   the foamed thermoplastic elastomer composition has no visible cracks.

2. The foamed thermoplastic elastomer composition according to claim 1, wherein the thermoplastic copolyester elastomer is present in an amount of at least 70 wt % based on the total weight of the foamed thermoplastic elastomer composition.

3. The foamed thermoplastic elastomer composition according to claim 1, further comprising a plasticizer in an amount of at most 30 wt % based on the total weight of foamed thermoplastic elastomer composition, and wherein the plasticizer is selected from the group consisting of terephthalates and esters thereof, dibasic acid esters, mellitates and esters thereof, cyclohexanoate esters, citrate esters, phosphate esters, modified vegetable oil esters, benzonate esters, petroleum oils and combinations thereof.

4. The foamed thermoplastic elastomer composition according to claim 1, wherein the RSV of the foamed thermoplastic elastomer composition is at least 4.2.

5. The foamed thermoplastic elastomer composition according to claim 1, wherein the foamed thermoplastic elastomer composition is in the form of beads having dimensions of between 1.0 and 10 mm.

6. The foamed thermoplastic elastomer composition according to claim 5, wherein the beads have dimensions of between 3.0 and 7.0 mm.

7. An article comprising the foamed thermoplastic elastomer composition according to claim 1.

8. The article according to claim 7, wherein the article is an inner shoe sole or a shoe midsole.

9. A process for preparing the foamed thermoplastic elastomer composition according to claim 1, wherein the process comprises the steps of:

(a) providing an unfoamed thermoplastic elastomer composition comprising the thermoplastic copolyester elastomer having hard segments comprised of polybutylene terephthalate and soft segments comprised of polytetramethylene oxide and having an RSV of at least 4.1 as measured according to ISO 1628-5:2015;

(b) bringing the unfoamed thermoplastic elastomer composition to a foaming temperature of between (Tm−100)° C. and Tm, in which Tm is the melting temperature of the polybutylene terephthalate hard segments of the thermoplastic copolyester as measured according to ISO 11357-1:2009 by DSC in the second heating curve, with a heating and cooling rate of 10° C. per min, under nitrogen atmosphere;

(c) providing a physical blowing agent under pressure to the unfoamed thermoplastic elastomer composition; and (d) releasing the pressure thereby forming the foamed thermoplastic elastomer composition and forming the foamed thermoplastic elastomer composition having a density between 0.1 to 0.7 g/cm$^3$ and no visible cracks.

10. The process according to claim 9, wherein the unfoamed thermoplastic elastomer composition comprises the thermoplastic copolyester elastomer in an amount of at least 70 wt % based on the total weight of the unfoamed thermoplastic elastomer composition.

* * * * *